(12) United States Patent
Lommen et al.

(10) Patent No.: US 11,952,839 B2
(45) Date of Patent: Apr. 9, 2024

(54) ELECTRICAL CONNECTOR

(71) Applicant: DEERE & COMPANY, Moline, IL (US)

(72) Inventors: Matthew Lommen, Bettendorf, IA (US); Jeffrey R. Hochstatter, Wyanet, IL (US); Amanda G. Harrison, Milan, IL (US)

(73) Assignee: Deere & Company, Moline, IL (US)

( * ) Notice: Subject to any disclaimer, the term of this patent is extended or adjusted under 35 U.S.C. 154(b) by 786 days.

(21) Appl. No.: 16/857,805

(22) Filed: Apr. 24, 2020

(65) Prior Publication Data
US 2021/0332648 A1 Oct. 28, 2021

(51) Int. Cl.
*H01R 13/17* (2006.01)
*E21B 17/02* (2006.01)
*F16L 19/06* (2006.01)
*H01R 43/20* (2006.01)

(52) U.S. Cl.
CPC .............. *E21B 17/02* (2013.01); *F16L 19/06* (2013.01); *H01R 13/17* (2013.01); *H01R 43/205* (2013.01)

(58) Field of Classification Search
CPC ......... F16L 37/18; F16L 41/03; F16L 41/001; H01R 13/17; H01R 13/64; H01R 13/6456
See application file for complete search history.

(56) References Cited

U.S. PATENT DOCUMENTS

| | | | | | |
|---|---|---|---|---|---|
| 1,784,236 | A * | 12/1930 | Jones | ............... | H01R 13/17 116/DIG. 41 |
| 2,102,625 | A * | 12/1937 | Hubbell, Jr. | ............. | H01R 13/17 439/140 |
| 2,958,842 | A * | 11/1960 | Schaefer | ............... | H01R 13/17 439/282 |
| 2,999,221 | A * | 9/1961 | Ellis | ...................... | H01R 13/64 439/600 |
| 3,233,203 | A | 2/1966 | Kennedy et al. | | |
| 3,339,039 | A * | 8/1967 | Daly | ...................... | H01R 13/64 200/275 |
| 4,408,521 | A * | 10/1983 | Schelli | .................... | F16L 37/18 72/448 |
| 5,135,410 | A * | 8/1992 | Kawase | .................. | F16L 37/18 439/372 |
| 5,316,347 | A * | 5/1994 | Arosio | .................... | F16L 37/18 285/85 |
| 5,507,530 | A * | 4/1996 | Mahaney | ................ | F16L 37/18 29/237 |

(Continued)

FOREIGN PATENT DOCUMENTS

| | | | | |
|---|---|---|---|---|
| DE | 102016004069 A1 * | 10/2017 | .............. | F16L 37/18 |
| EP | 1657481 A2 * | 5/2006 | .............. | F16L 37/18 |
| WO | WO-2007106036 A2 * | 9/2007 | .............. | F16L 37/18 |

OTHER PUBLICATIONS

The International Search Report and the Written Opinion of the International Searching Authority issued in counterpart application No. PCT/US2020/032136 dated Jul. 28, 2020 (8 pages).

*Primary Examiner* — Matthew Troutman
*Assistant Examiner* — Fannie C Kee

(57) ABSTRACT

Connectors may include a first part and a second part that are adapted to be locked together. The first and second parts may include compatible features that provide one or more connections, such as electrical and hydraulic connections, when the first and second part are secured together.

18 Claims, 3 Drawing Sheets

(56) References Cited

U.S. PATENT DOCUMENTS

| | | | | |
|---|---|---|---|---|
| 5,603,624 A | * | 2/1997 | Taguchi | F16L 37/18 439/372 |
| 5,984,371 A | * | 11/1999 | Mailleux | F16L 37/18 285/901 |
| 6,447,312 B1 | * | 9/2002 | Takata | F16L 37/18 439/372 |
| 7,258,369 B2 | * | 8/2007 | Martin | F16L 37/18 285/38 |
| 7,407,396 B2 | * | 8/2008 | Dillon | F16L 37/18 439/157 |
| 8,992,236 B2 | | 3/2015 | Wittig et al. | |
| 9,439,349 B2 | | 9/2016 | Drake et al. | |
| 2004/0132329 A1 | | 7/2004 | Shimoyama et al. | |
| 2005/0208820 A1 | | 9/2005 | Sanuki | |
| 2006/0130910 A1 | * | 6/2006 | Knuthson | F16L 37/18 137/614.02 |
| 2009/0023315 A1 | | 1/2009 | Pfeiffer | |
| 2009/0058077 A1 | * | 3/2009 | Schulz | F16L 37/18 285/81 |
| 2016/0294081 A1 | | 10/2016 | Tsang et al. | |
| 2016/0322739 A1 | * | 11/2016 | Taylor | H01R 13/17 |
| 2017/0202128 A1 | * | 7/2017 | Emmert | F16L 37/18 |
| 2017/0294740 A1 | * | 10/2017 | Tsukahara | H01R 13/64 |
| 2019/0003600 A1 | | 1/2019 | Reich et al. | |
| 2019/0093808 A1 | * | 3/2019 | Danelli | F16L 37/18 |
| 2019/0242511 A1 | * | 8/2019 | Danelli | F16L 37/18 |

* cited by examiner

ELECTRICAL CONNECTOR

FIELD OF THE DISCLOSURE

The present disclosure relates generally to electrical connectors.

BACKGROUND OF THE DISCLOSURE

Multicouplers are devices having a first portion coupled to a vehicle, such as a combine harvester, and a second portion that is coupled to an implement, such as a corn head or draper head. In some cases, the first and second portions of a multicoupler include mating portions of different electrical and hydraulic connections that are formed when the first and second portions of the multicoupler are engaged. Further, in some cases, the first and second portions of the multicoupler may be locked together using a rotary-style locking apparatus. Multicouplers provided for making electrical, hydraulic, or other type of connections with using a single device and securing those connections together.

SUMMARY OF THE DISCLOSURE

A first aspect of the present disclosure is directed to a connector. The connector may include a first portion comprising a first protrusion and a second portion, the first portion receivable into the second portion. The second portion may include a first slot extending along a length of the second portion by a first amount and a second slot extending along the length of the second portion by a second amount less than the first amount. The first protrusion may be receivable into the first slot when the first portion is received into the second portion, and the first portion may be fully receivable into the second portion to form a completed connection.

A second aspect of the present disclosure is directed to a multicoupler. The multicoupler may include a first body part and a second body part. The first body part may include a plurality of first apertures and a first plug of an electrical connector disposed in one of the first apertures. The second body part may include a plurality of second apertures and a first receptacle of the electrical connector disposed in one of the second apertures. The first receptacle may include a first slot and a second slot angularly offset from the first slot. The first plug may be receivable into the first receptacle, and the protrusion may be received into the first slot when the first body part is aligned with the second body part.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
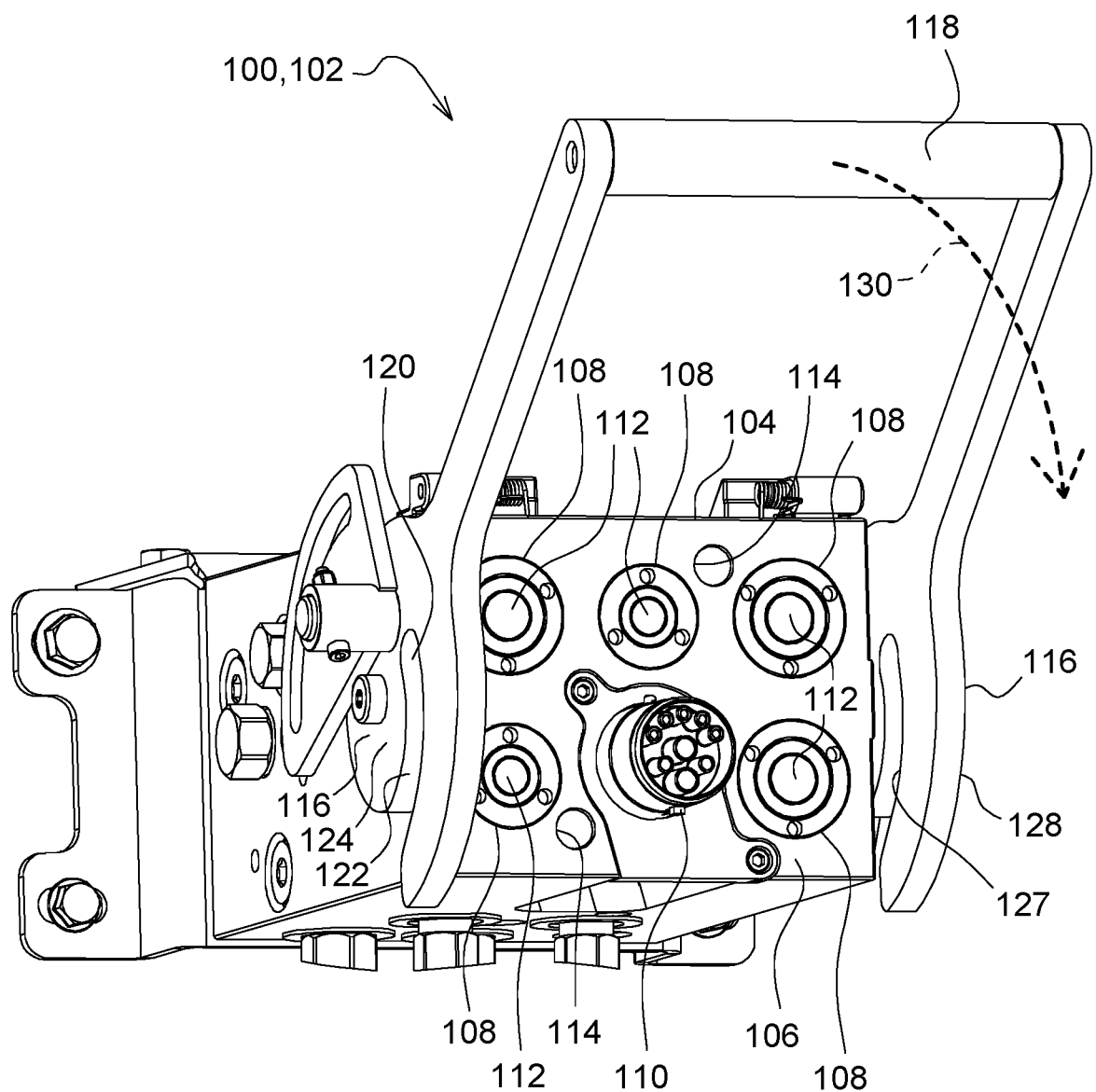
FIG. 1 is a perspective view of a first part of an example multicoupler, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to connectors configured to prevent inadvertent connection with incompatible components of other connector types. Particularly, the present disclosure is directed to electrical connectors having a configuration that is incompatible with connectors similarly situated. For example, a revision to or improvement made to a device may include an electrical connector that is modified or changed to reflect the improvement made to the associated device. However, in order to avoid problems associated with incompatibility between the electrical connector of the improved device and a previous version of the device, a configuration of the electrical connector may be varied to avoid damage to either components of the new connectors or components of the previous connectors.

Described below are example implementations involving multicouplers. However, the scope of the present disclosure is not limited to multicouplers. Rather, the present disclosure encompasses any coupler type that includes an electrical connector or electrical connectors, in general, configured to prevent damage to the electrical connector due to full engagement or attempted full engagement between different portions of incompatible connectors. Further, although electrical connectors are described, the concepts described herein may also be applied to other types of connectors.

Implementations described herein are made in the context of agricultural equipment. However, the concepts described in the context of the presented examples are not intended to be limiting to agriculture. Rather, the scope of the present disclosure is applicable to fields outside of the agricultural arts, and the present disclosure is intended to encompass all applicable areas.

FIG. 1 is a perspective view of a first part 100 of a multicoupler 102 that may be used to provide a releasable connection between an agricultural vehicle, such as a combine harvester, and an agricultural implement, such as a header for a combine harvester. The first part 100 may be included on an agricultural vehicle. However, in other implementations, the first part 100 may form part of an agricultural implement that is removable coupled to the agricultural vehicle.

Figure 2:
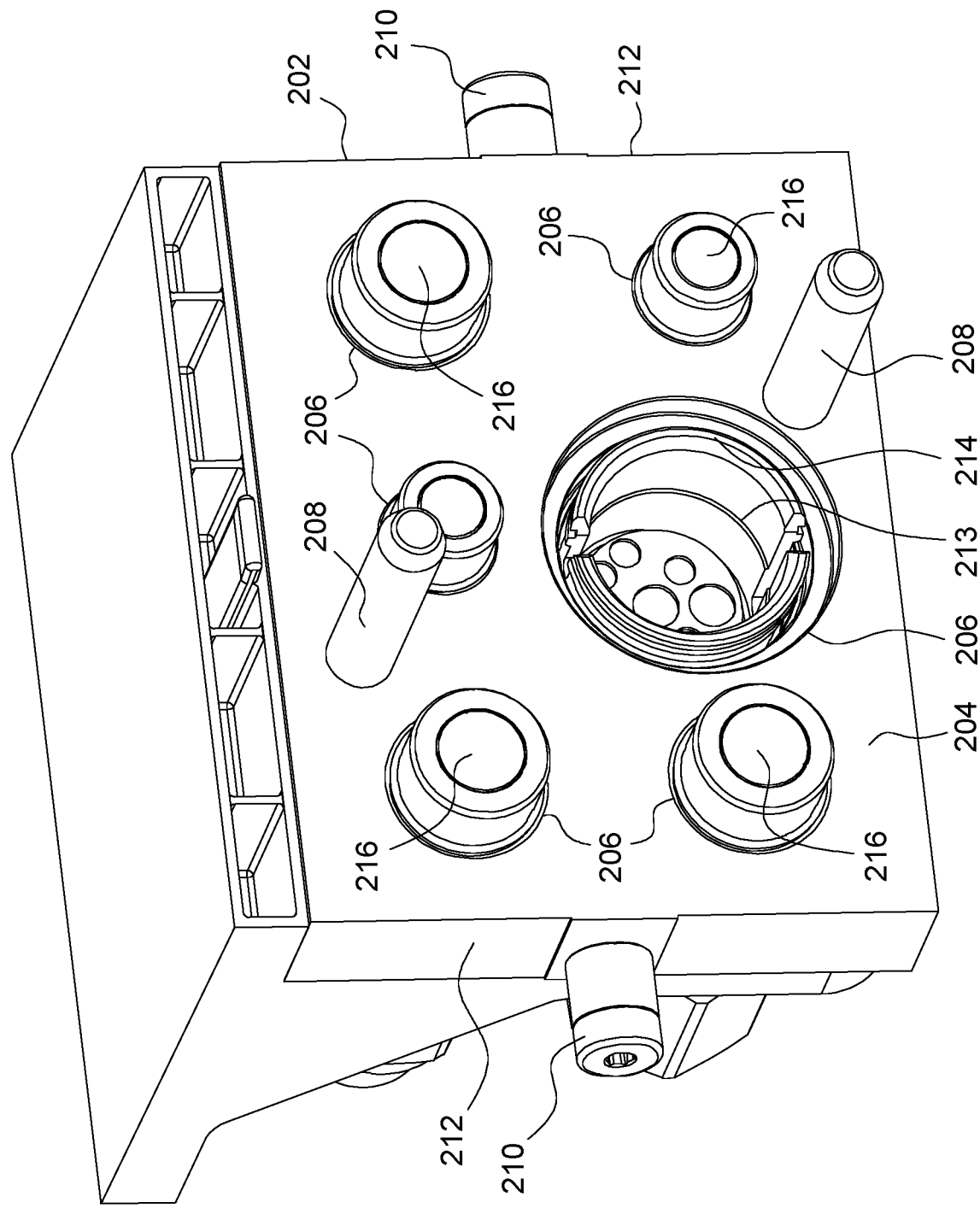
FIG. 2 is a perspective view of a second part of the example multicoupler of FIG. 1, according to some implementations of the present disclosure.

FIG. 2 is a perspective view of a second part 200 of the multicoupler 102. The second part 200 may be included on an agricultural implement. In other implementations, the second part 200 may form part of an agricultural vehicle. The second part 200 is removably couplable to the first part 100 in order to form a completed circuit, such as an electrical circuit, hydraulic circuit, optical circuit, or pneumatic circuit, between an agricultural vehicle and an agricultural implement. The completed electrical circuit may be used provide electrical power to the agricultural implement in order to operate one or more components of the agricultural implement, such as an electric motor. The electrical connection may also be used to transmit information between the agricultural vehicle and the agricultural implement. The coupled first and second parts 100 and 200 may form one or more hydraulic connections. The hydraulic connections form hydraulic circuits that may be used operate one or more components of the agricultural implement, such as operating a hydraulic cylinder.

Referring to FIGS. 1 and 2, the first part 100 includes a body 104 that includes a mating face 106 adapted to abut a mating end face 204 formed on the second part 200 and plurality of apertures 108. One or more of the apertures 108 contain a portion of a connector, such as an electrical connector, a hydraulic connector, or other type of connector, such an optical connector. Although the illustrated example includes six apertures 108, additional or fewer apertures 108 may be used. Further, in the illustrated example, one of the apertures 108 houses a plug 110 of an electrical connector and the remaining apertures 108 house hydraulic connector portions 112. In other implementations, additional electrical connectors may be included and fewer hydraulic connectors may be included. Further, in some implementations, one or more of the apertures 108 may remain unused.

The first part 100 also includes alignment apertures 114 adapted to receiving protrusions 208 extending from the end face 204 of the second part 200. The mating protrusions 208 and apertures 114 align the first part 100 and the second part 200 during connection. The first part 100 also includes opposing sides 116 and a rotatable locking portion 118 adapted to seat and lock the second part 200 to the first part 100 to form a completed connection. Curved slots 120 are formed on each side 116 of the first part 100 defined between an outer surface 122 of curved portions 124 and an inner surface 127 formed on curved portion 129 of the rotatable locking portion 118.

The second part 200 includes a body 202. The body 202 defines the end face 204 and includes a plurality of apertures 206. A receptacle 214 is housed within one of the apertures 206 that corresponds to the aperture 108 housing the plug 110. The remaining apertures 206 house hydraulic connector portions 216 that engage the hydraulic connector portions 112 housed in corresponding apertures 108 located in the first part 100. The hydraulic connector portions 216 extend beyond the end face 204 and depress the hydraulic connector portions 112 to form a hydraulic connection when the first and second parts 100 and 200 are connected. When the first and second parts 100 and 200 are properly aligned, the protrusions 208 align with and are receivable into the apertures 114, and the apertures 206 in the second part 200 align with corresponding apertures 108 formed in the first part 100.

The second part 200 also includes pins 210 extending from opposing sides 212 of the body 202. The pins 210 are received into the curved slot 120 defined in the first part 100. Although two pins 210 are shown, other implementations may include additional or fewer pins 210. Connecting the first part 100 to the second part 200 also includes receiving the pins 210 into the curved slots 120 and rotating the rotatable locking portion 118 to secure the pins 210 in the curved slots 120.

To connect the first part 100 and the second part 200, the body 104 of the first part 100 and the body 202 of the second part are brought into the proximity of each other and oriented such that the protrusions 208 are received into the apertures 114. Because the first part 100 is generally fixed on an agricultural vehicle, the second part 200 is brought into contact with the first part 100 such that the end faces 106 and 204 abut each other, resulting in the hydraulic connector portion 216 being received into the corresponding apertures 108 and depressing the counterpart hydraulic connector portions 112. Further, the plug 110 is aligned with and received into the receptacle 214.

With the end faces 106 and 204 in contact with each other, the rotatable locking portion 118 is rotated in the direction of arrow 130 to capture the pins 210 in the curved slots 120 between the curved portions 124 and the curved portions 129. With the rotatable locking portion 118 rotated into a locking position, the first and second parts 100 and 200 are secured together to form the electrical and hydraulic connections through the multicoupler 102.

Figure 3:
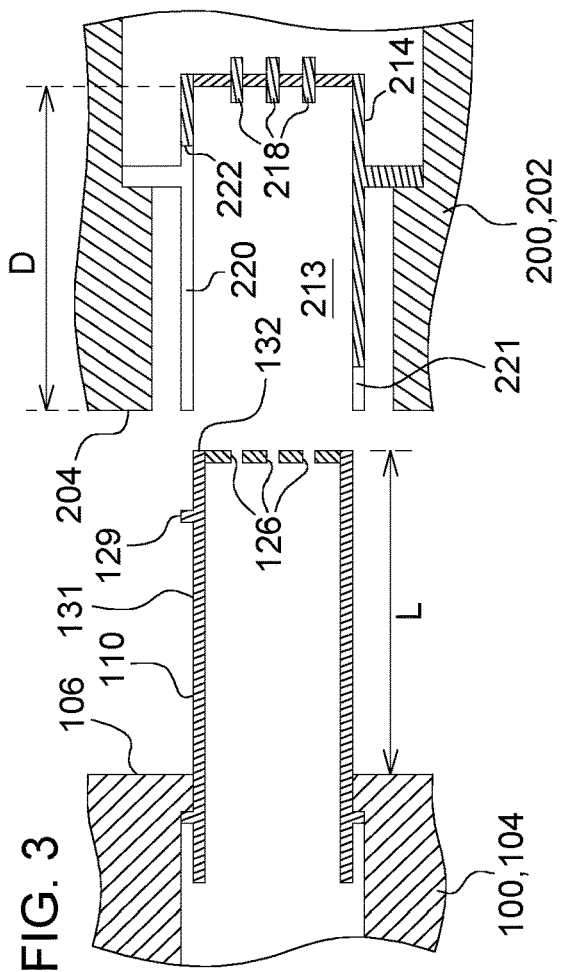
FIG. 3 is a cross-sectional detail view of a first portion and second portion of another multicoupler, according to some implementations of the present disclosure.

As shown in FIG. 1, the electrical connector 110 extends beyond the end face 106, and the electrical connector 110 is received into a cavity 213 of a receptacle 214 when the first part 100 and the second part 200 are connected. FIG. 3 is a partial cross-sectional view of the first part 100 and second part 200 showing the plug 110 and receptacle 214 in a separated condition. As shown in FIG. 3, the plug 110 extends a length L from the end face 106 and includes a plurality of apertures 126 adapted to receive electrical pins 218 contained in the receptacle 214. Although three apertures 126 and three corresponding electrical pins 218 are shown, in other implementations, additional or fewer apertures 126 and electrical pins 218 may be used. In some implementations, nine electrical pins 218 are present. In other implementations, additional or fewer electrical pins 218 may be provided. The plug 110 also includes a protrusion 128 formed on an exterior surface 131 of the plug 110. The protrusion 128 is offset from an end 132 of the plug 110. The protrusion 128 aligns with a slot 220 formed in the receptacle 214. The receptacle 214 also includes a second slot 221. The second slot may be angularly offset along a circumference of the receptacle 214 by 180°, for example.

The protrusion 128 and slot 220 cooperate to ensure that the plug 110 and the receptacle 214 are aligned and compatible. The slot 220 has a size that accommodates the protrusion 128 to permit complete insertion of the portion of the plug 110 extending from the end face 106. When the end faces 106 and 204 contact each other, an end 222 of the slot 220 contacts the protrusion 128, limiting further insertion of the plug 110 into the receptable 214. In other implementations, the end 222 of the slot 220 may not contact the protrusion 128 when the end faces 106 and 204 contact each other.

Figure 4:
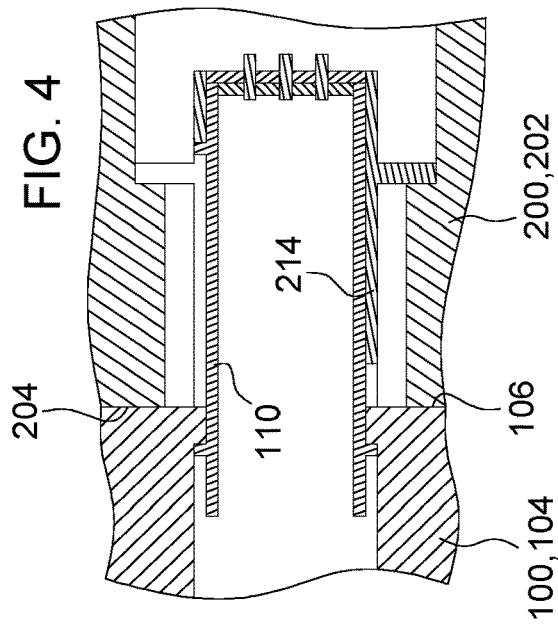
FIG. 4 is a cross-sectional detail view of the first portion and second portion of FIG. 3 fully coupled together.

FIG. 4 shows the end faces 106 and 204 abutting each other and the plug 110 fully inserted into the receptacle 214. With the plug 110 fully inserted into the receptable 214, the electrical pins 218 are received into the apertures 126, forming an electrical connection, and the protrusion 128 contacts the end 222 of the slot 220. Further, the connected configuration of the first part 100 and the second part 200 shown in FIG. 4 corresponds to the first part 100 and the second part 200 being locked together by actuation of the rotatable locking portion 118.

Important features of multicoupler 102 include the length L by which the plug 110 extends from the end face 106, a depth D of the cavity 213 of the receptacle 214, and the cooperating protrusion 128 and slot 220. For example, these features prevent damage when incompatible parts of different multicouplers are attempted to be coupled.

Figure 5:
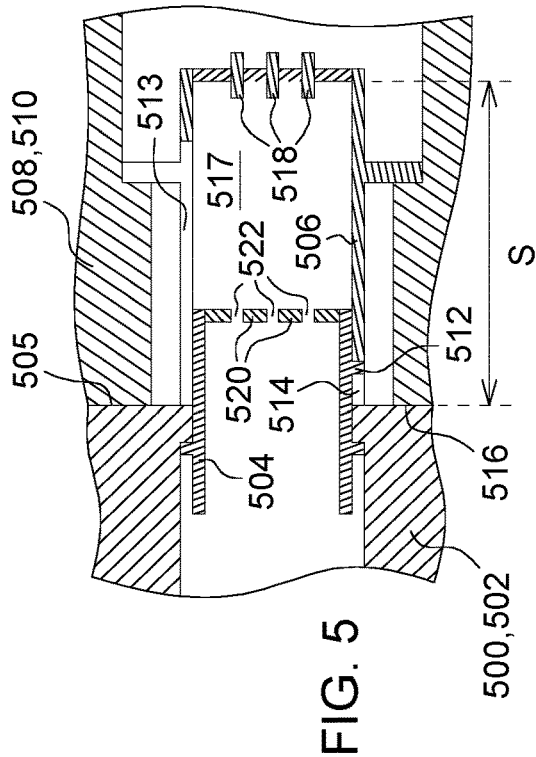
FIG. 5 is a cross-sectional detail view of a plug of a first part of a first type of multicoupler engaged with a receptacle of a second part of a second type of multicoupler that is incompatible with the first type of multicoupler, according to some implementations of the present disclosure.

FIG. 5 shows a cross-sectional view of incompatible parts of different multicouplers. A first part 500 of a first type of multicoupler 502 may represent a previous multicoupler design. The first part 500 includes a plug 504, which may be a previous plug design. A portion of the plug 504 extending from an end face 505 of the first part 500 is fully received into a receptacle 506 of a second type of electrical connector, which may be a more recent design. The receptacle includes a first slot 513 and a second slot 514. The receptacle 506 is included in a second part 508 of a multicoupler 510 that is incompatible with the multicoupler 502 and represents a more recent electrical connector design. Additionally, the plug 504 includes a protrusion 512 that is received into the second slot 514 formed in the receptacle 506. The end face 505 of the first part 500 is in abutting contact with an end face 516 of the second part 508. Thus, in the illustrated example of FIG. 5, the first part 500 and the second part 508 are fully engaged. Although the first part 500 and the second part 508 are able to be fully engaged, an electrical connection between the plug 504 and the receptacle 506 is prevented because the length S of a cavity 517 of the receptacle 506 is larger than a length of the plug 504 extending from the end face 505. As a result, electrical pins 518 are prevented from engaging with an end 520 of the plug 504. This lack of connectivity is important where, for example, an arrangement of the pins 518 is different from that associated with the plug 504 and where damage to the plug 504 or receptacle 506 may otherwise occur if the lengths were similar.

In the example of FIG. 5, the second part 508 is similar to the second part 200 shown in FIGS. 3 and 4, and the receptacle 506 is similar to the receptacle 214. As explained earlier, the first part 500 of the multicoupler 502 may represent a previous version of a multicoupler 510 that is incompatible with the multicoupler 510. For example, the first part 500 and associated multicoupler 502 may represent an earlier design, while the second part 508 and associated multicoupler 510 may represent a later design, and the configuration of the second part 508 and, particularly, the design of the receptacle 506, permits coupling between the first and second parts 500 and 508 but prevents electrical connection between the plug 504 and the receptacle 506. Such an arrangement prevents damage to the receptacle 506, such as damage to the electrical pins 518, where apertures 522 of the plug 504 may have a different arrangement than an arrangement defined by the electrical pins 518.

The interaction illustrated in FIG. 5 is deliberate to avoid damage to the electrical coupler even though the first and second parts 500 and 508 of the different respective multicouplers 502 and 510 are permitted to become fully engaged. For example, although not used when a compatible plug is received into the counterpart receptacle 506 (as described, for example, in the context of FIGS. 3 and 4), the receptacle 506 includes the second slot 514 that permits complete insertion of the portion of the plug 504 extending from the end face 505 into the receptacle 506 without causing any damage to the receptacle 506.

Figure 6:
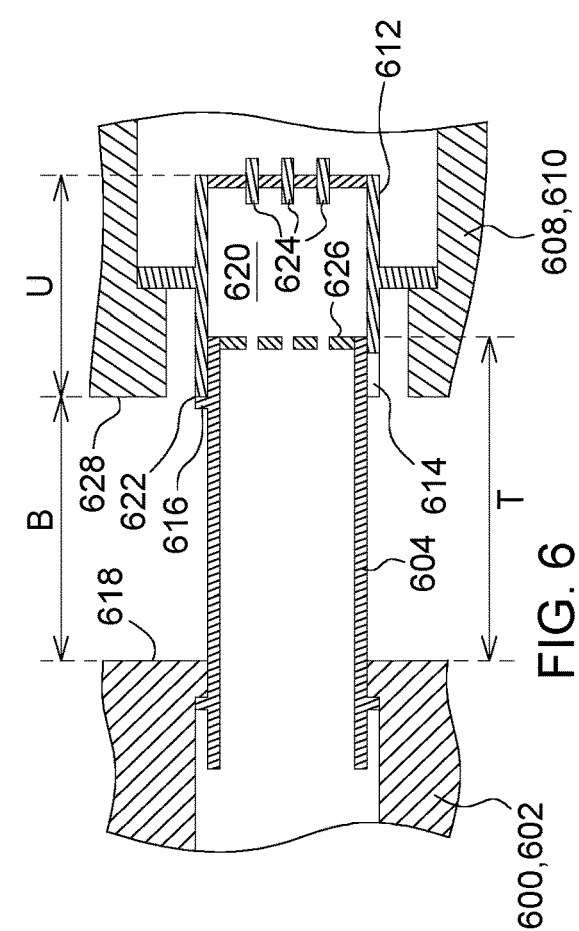
FIG. 6 is a cross-sectional detail view of a receptacle of a first part of a second type of multicoupler engaged with a plug of second part of a first type of multicoupler that is incompatible with the second type of multicoupler, according to some implementations of the present disclosure.

FIG. 6 is another cross-sectional view of incompatible parts of different multicouplers. In this case, a first part 600 of a first multicoupler 602 includes a plug 604 that represents a new or later design, and a second part 608 of a second multicoupler 610 includes a receptacle 612 that represents a previous design that is incompatible with the new plug 604.

The receptacle 612 includes a slot 614 that does not align with a protrusion 616 formed on the plug 604 when the first part 600 and the second part 608 are brought into alignment. In this example, the protrusion 616 may be oriented 180° from the slot 614. A length T of the plug 604 extending from an end face 618 of the first part 600 is greater than a length U of a cavity 620 formed by the receptacle 612.

When a connection between the first part 600 and the second part 608 is attempted, the protrusion 616 contacts an edge 622 of the receptacle 612, preventing insertion of the plug 604 into the cavity 620 of the receptacle 612 beyond the protrusion 616. It is noted that, in this example, the receptacle 612 and associated slot 614 corresponds to the plug 504 and associated protrusion 512 shown in FIG. 5, both of which represent a previous design.

The receptacle 612 lacks a slot similar to the slot 513 shown in FIG. 5. Consequently, the protrusion 616 prevents the plug 604 from being further inserted into the receptacle 612, and electrical pins 624 of the receptacle 612 are prevented from becoming engaged with an end 626 of the plug 604. As a result, a gap B is created between the end face 618 of the first part 600 and an end face 628 of the second part 608. This gap B prevents the first part 600 and the second part 608 from becoming fully engaged, preventing an associated rotatable locking portion (which may be similar to the rotatable locking portion 118 shown in FIG. 1) from rotating and securing the first part 600 and the second part 608 together. Thus, a later electrical connector design represented by the plug 604 operates to prevent connection of parts of incompatible multicouplers.

Without in any way limiting the scope, interpretation, or application of the claims appearing below, a technical effect of one or more of the example embodiments disclosed herein is to providing electrical connectors and associated multicouplers that prevent damage to the electrical connector when a part of the multicoupler is attempted to be joined with a part of an incompatible multicoupler.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A connector comprising:
a first portion comprising a first protrusion; and
a second portion, the first portion receivable into the second portion, the second portion comprising:
  a first slot extending along a length of the second portion by a first amount; and
  a second slot extending along the length of the second portion by a second amount less than the first amount, the first protrusion receivable into the first slot when the first portion is received into the second portion, the first portion fully receivable into the second portion to form a completed connection,
wherein the first portion comprises a plurality of openings formed at a first end of the first portion, wherein the second portion comprises a plurality of pins at a first end of the second portion, wherein each of the plurality of pins is received into a corresponding one of the plurality of openings when the completed connection is made.

2. The connector of claim 1, wherein the first protrusion is offset from a distal end of the first portion.

3. The connector of claim 1, wherein the second portion is operable to receive a second first portion, a second protrusion formed on the second first portion located at a position that is angularly offset from a position of the first protrusion, the second protrusion receivable into the second slot when the second first portion is received into the second portion, the second first portion fully received into the second portion but preventing a completed connection between the second first portion and the second portion.

4. The connector of claim 1, wherein the first slot and the second slot are angularly offset from each other by 180°.

5. The connector of claim 1, further comprising a coupler comprising:
   a first coupler portion, the first coupler portion including the first portion; and
   a second coupler portion, the second coupler portion including the second portion, wherein an end face of the first coupler portion abuts an end face of the second coupler portion when the first portion and the second portion form the completed connection.

6. The connector of claim 5, wherein the first portion is configured to form a gap between the end face of the first coupler portion and an end face of a coupler portion attached to a second second portion when the first portion is received into the second second portion.

7. The connector of claim 5, wherein the first portion is operable to be received into a second second portion, the first protrusion on the first portion is configured to contact an edge of the second second portion to form a gap between the end face of the first coupler portion and an end face of a coupler portion attached to the second second portion.

8. The connector of claim 7, wherein the contact between the edge of the second second portion and the first portion prevents complete insertion of the first portion into the second second portion.

9. A multicoupler comprising:
   a first body part comprising:
      a plurality of first apertures; and
      a first plug of an electrical connector disposed in one of the plurality of first apertures, the first plug comprising a protrusion;
   a second body part comprising:
      a plurality of second apertures; and
      a first receptacle of the electrical connector disposed in one of the plurality of second apertures, the first receptacle comprising:
         a first slot; and
         a second slot angularly offset from the first slot, the first plug receivable into the first receptacle and the protrusion received into the first slot when the first body part is aligned with the second body part.

10. The multicoupler of claim 9, wherein the first plug comprises a plurality of third apertures formed at a first end of the first plug, wherein the first receptacle comprises a plurality of electrical pins, the plurality of electrical pins aligned with and received into the plurality of third apertures when the first plug is completely received into the first receptacle.

11. The multicoupler of claim 10, wherein the first plug comprises nine third apertures and wherein the first receptacle comprises nine electrical pins.

12. The multicoupler of claim 9, wherein the angular offset between the first slot and the second slot is 180°.

13. The multicoupler of claim 9, wherein a length of the first slot is greater than a length of the second slot.

14. The multicoupler of claim 9, wherein the second slot of the first receptacle is configured to receive a second protrusion formed on a second plug of a third body part, wherein an end face of the third body part and the second body part abut each other when the second body part and the third body part are aligned and when the second plug is received into the first receptacle.

15. The multicoupler of claim 14, wherein the receptacle further comprises a cavity having a first length and wherein the cavity is configured to receive the second plug having a second length less than the first length.

16. The multicoupler of claim 9, wherein the protrusion of the first plug is configured to contact an edge of a second receptacle of a fourth body part, and wherein a gap is formed between an end face of the first body part and an end face of the fourth body part when the protrusion contacts the edge of the second receptacle.

17. The multicoupler of claim 9, wherein the first body part comprises a rotatable locking portion and a slot, wherein the second body part comprises a pin, and wherein the rotatably locking portion is rotatable from an open position to a closed position when the pin is received into the slot to secure the first body part to the second body part.

18. The multicoupler of claim 17, wherein the slot is a curved slot.

* * * * *